US009502893B2

(12) United States Patent
Ci

(10) Patent No.: US 9,502,893 B2
(45) Date of Patent: Nov. 22, 2016

(54) DISTRIBUTED POWER SUPPLY SYSTEM AND METHOD

(71) Applicant: Nova Greentech, Inc., Omaha, NE (US)

(72) Inventor: Song Ci, Omaha, NE (US)

(73) Assignee: Nova Greentech, Inc., Omaha, NE (US)

( * ) Notice: Subject to any disclaimer, the term of this patent is extended or adjusted under 35 U.S.C. 154(b) by 822 days.

(21) Appl. No.: 13/677,419

(22) Filed: Nov. 15, 2012

(65) Prior Publication Data

US 2014/0077606 A1    Mar. 20, 2014

(30) Foreign Application Priority Data

Sep. 20, 2012    (CN) .......................... 2012 1 0353456
Sep. 20, 2012    (CN) ..................... 2012 2 0484383 U

(51) Int. Cl.
| H02J 1/00 | (2006.01) |
| H02J 1/10 | (2006.01) |
| H02J 7/34 | (2006.01) |
| H02J 9/06 | (2006.01) |
| H02J 13/00 | (2006.01) |

(52) U.S. Cl.
CPC .. *H02J 1/00* (2013.01); *H02J 1/10* (2013.01); *H02J 7/34* (2013.01); *H02J 9/062* (2013.01); *H02J 13/0003* (2013.01); *Y02B 90/222* (2013.01); *Y04S 20/12* (2013.01); *Y10T 307/658* (2015.04)

(58) Field of Classification Search
CPC ................. H02J 1/00; H02J 1/10; H02J 7/34

USPC ............................................................ 307/72
See application file for complete search history.

(56) References Cited

U.S. PATENT DOCUMENTS

| 5,381,554 A * | 1/1995 | Langer ...................... G06F 1/26 307/38 |
| 5,850,351 A | 12/1998 | Lotfy et al. |
| 2005/0071092 A1* | 3/2005 | Farkas ....................... H02J 3/14 702/60 |
| 2005/0146223 A1* | 7/2005 | Kanouda et al. ............... 307/66 |
| 2007/0114852 A1* | 5/2007 | Lin ........................... H02J 1/10 307/66 |
| 2009/0050591 A1 | 2/2009 | Hart et al. |
| 2010/0013314 A1* | 1/2010 | Groff ...................... H02J 9/061 307/66 |
| 2010/0314950 A1 | 12/2010 | Rutkowski et al. |
| 2011/0046835 A1* | 2/2011 | Taguchi ......................... 701/22 |
| 2011/0208453 A1 | 8/2011 | Ci et al. |
| 2011/0304211 A1* | 12/2011 | Peterson ................. G06F 1/263 307/48 |

* cited by examiner

*Primary Examiner* — Rexford Barnie
*Assistant Examiner* — Thai Tran
(74) *Attorney, Agent, or Firm* — Suiter Swantz pc llo

(57) ABSTRACT

A distributed power supply system and a method for managing such a distributed power supply system is disclosure. The method may include: for each power storage unit i of the plurality of power storage units, determining whether power storage unit i have sufficient status of charge (SOC) based on SOC of the power storage unit i ($C_i$), and load of the power storage unit i ($L_i$); identifying a set of power storage units that have insufficient SOC; and adjusting output power of the power storage units that have sufficient SOC to provide supplemental power to the set of power storage units that have insufficient SOC.

10 Claims, 5 Drawing Sheets

DISTRIBUTED POWER SUPPLY SYSTEM AND METHOD

CROSS-REFERENCE TO RELATED APPLICATIONS

The present application claims priority based on Chinese Application No. 201210353456.7 filed Sep. 20, 2012, the disclosure of which is hereby incorporated by reference in its entirety. The present application also claims priority based on Chinese Application No. 201220484383.0 filed Sep. 20, 2012, the disclosure of which is also hereby incorporated by reference in its entirety.

TECHNICAL FIELD

The present invention relates to the field of power supply and particularly to a system and method for providing distributed power supply.

BACKGROUND

Providing reliable power supplies are essential for systems such as data centers, server farms and the like. A conventional uninterruptible power supply, or UPS, is an electrical apparatus that provides emergency power to a load when the input power source, typically mains power, fails. Such a UPS system typically includes multiple batteries grouped together in a centralized manner for power storage, and provides protection from input power interruptions by supplying the power stored in these batteries. However, in order to provide sufficient power storage, a conventional UPS system independently occupies a relatively large portion of dedicated physical space, which is not ideal for systems such as data centers, server farms and the like. Furthermore, a centralized UPS system may also be a single point of failure. Therein lies the need to provide a system and method for providing power supply without the aforementioned shortcomings.

SUMMARY

Accordingly, an embodiment of the present disclosure is directed to a distributed power supply system. The system may include a plurality of power storage units and a plurality of DC power supply units. Each particular DC power supply unit of the plurality of DC power supply units corresponds to one particular power storage unit of the plurality of power storage units. Each particular DC power supply unit is operable in at least one of: a first mode when the particular DC power supply unit receives mains power, wherein the particular DC power supply unit converts mains power to DC power and provides DC power to at least one electrical device coupled to the particular DC power supply unit; and a second mode when the particular DC power supply unit does not receive mains power, wherein the particular DC power supply unit draws DC power from its corresponding power storage unit and provides DC power to the at least one electrical device coupled to the particular DC power supply unit. The system further includes a power supply controller in communication with each of the plurality of power storage units. The power supply controller is configured for controlling output power of each of the plurality of power storage units.

A further embodiment of the present disclosure is directed to a method for managing the distributed power supply system. The method may include: for each power storage unit i of the plurality of power storage units, determining whether power storage unit i have sufficient status of charge (SOC) based on SOC of the power storage unit i ($C_i$), and load of the power storage unit i ($L_i$); identifying a set of power storage units that have insufficient SOC; and adjusting output power of the power storage units that have sufficient SOC to provide supplemental power to the set of power storage units that have insufficient SOC.

An additional embodiment of the present disclosure is also directed to a method for managing the distributed power supply system. The method may include: for each power storage unit i of the plurality of power storage units, determining whether power storage unit i have sufficient status of charge (SOC) based on SOC of the power storage unit i ($C_i$), and load of the power storage unit i ($L_i$); identifying a set of power storage units that have insufficient SOC; calculating a supplemental power $\Delta L_i = L_i - C_i + C_{threshold}$ when power storage unit i have insufficient SOC; determining an optimal solution for an optimization function defined as:

Minimize:
$$\sum_{j \in (\Theta - \Psi)} \frac{x_j}{C_i - L_i - C_{threshold}}$$

Subject to:
$$\sum_{j \in (\Theta - \Psi)} x = \sum_{i \in \Psi} \Delta L_i$$

$$x_j \geq 0, \forall j \in (\Theta - \Psi)$$

wherein $\Theta$ denotes the set of all power storage units, $\Psi$ denotes the set of power storage units that have insufficient SOC, and x denotes supplemental output power needed from power storage unit j; and adjusting output power of power storage unit j, $j \in (\Theta - \Psi)$ based on the calculated supplemental power $x_j$ to provide supplemental power to the set of power storage units that have insufficient SOC.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
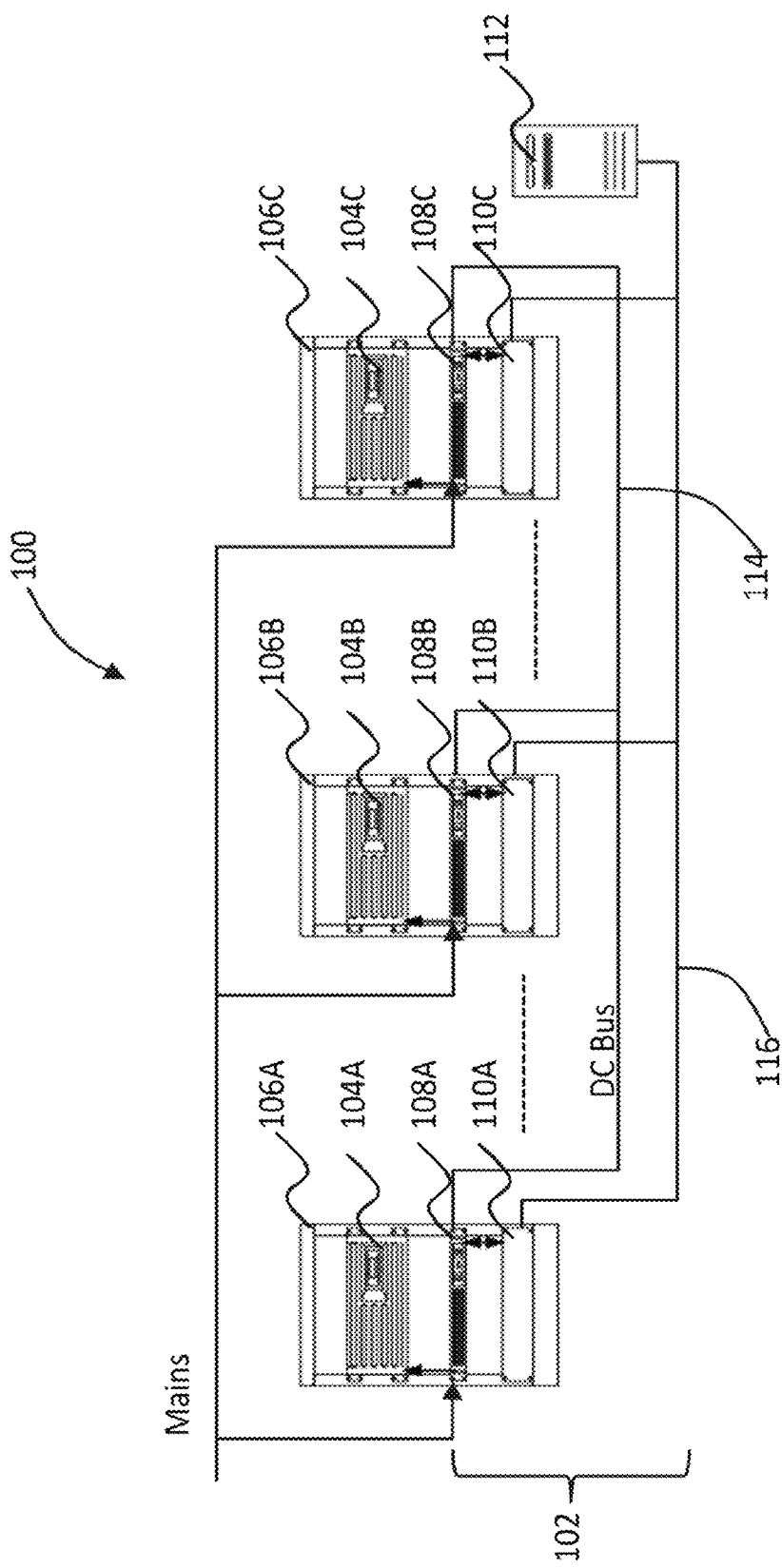
FIG. 1 is a block diagram depicting a computing system utilizing a distributed power supply system in accordance with the present disclosure.

The present disclosure is directed to a system and method for providing distributed power supply with consideration of battery status of charge (SOC) level and the power load level. In accordance with the present disclosure, power storage units (e.g., batteries) are distributed across various components (e.g., servers) of the computing system. Referring now to FIG. 1, a block diagram illustrating an exemplary computing system 100 utilizing distributed power supply 102 in accordance with the present disclosure is shown. The computing system 100 includes one or more servers 104 mounted to their corresponding server racks 106. The servers 104 may be blade servers or the like without departing from the spirit and scope of the present disclosure.

Each server 104 also corresponds to a local DC power supply unit 108, which may also be mounted to the corresponding server rack 106. Each DC power supply unit 108 is configured to receive power from mains and provide DC power to its corresponding server 104. Each DC power supply unit 108 is further configured to provide DC power to a corresponding local power storage unit 110. Each power storage unit 110 stores the power received and provides protection from power interruptions by supplying the power back to its corresponding DC power supply unit 108 in the event of an interruption.

In accordance with the present disclosure, the power storage units 110 are also configured to be in communication with a power supply controller 112. Furthermore, the DC power supply units 108 are connected to each other via a DC bus 114. Such a configuration provides power sharing abilities that allow any given power storage unit 110 to provide power to any server 104 in the computing system 100 in the event of a power interruption. This ability may be appreciated in various situations. For instance, if it is determined that server 104A consumes more power than server 104C, a portion or all of the power stored in the power storage unit 110C may be utilized to provide additional power for server 104A.

More specifically, each power storage unit 110 may include a management unit that monitors the SOC C and the load L of that particular power storage unit 110 in real-time and provides such information to the power supply controller 112. Let $C_i$ and $L_i$ denote the SOC and the load of the power storage unit 110 on rack i. The power supply controller 112, upon receiving such information, makes the following determination:

1) If $C_i - L_i \geq C_{threshold}$ the power storage unit 110 in rack i is considered sufficient to power the corresponding server 104 in rack i; and
2) If $C_i - L_i < C_{threshold}$ the power storage unit 110 in rack i is considered insufficient to power the corresponding server 104 in rack i, with only $C_i - C_{threshold}$ available locally, and needs a supplemental power of $\Delta L_i = L_i - C_i + C_{threshold}$;

Wherein $C_{threshold}$ denotes the lower threshold that the power storage unit can still release power.

With this information, the power supply controller 112 can compile set of server racks, denoted as $\Psi$, determined to have insufficient local power supply, i.e., $C_i - L_i < C_{threshold}$. Let $\Theta$ denote the set of all server racks, $\Theta - \Psi$ therefore denotes the set of servers with sufficient local power supply. The power storage unit 110 in rack j, $j \in (\Theta - \Psi)$ therefore needs to provide power not only to its corresponding local server 104, but also to the servers in $\Psi$. Now let $x_j$ denote the amount of power that the power storage unit 110 in rack j needs to provide to servers in $\Psi$, the value of $x_j$ can be determined utilizing an optimization function defined as follows:

Minimize:
$$\sum_{j \in (\Theta - \Psi)} \frac{x_j}{C_i - L_i - C_{threshold}}$$

Subject to:
$$\sum_{j \in (\Theta - \Psi)} x = \sum_{i \in \Psi} \Delta L_i$$

$$x_j \geq 0, \forall j \in (\Theta - \Psi)$$

It is contemplated that the power supply controller 112 may utilize various techniques/algorithms to solve the optimization function defined above to obtain the value of $x_j$, $j \in (\Theta - \Psi)$. The power supply controller 112 may then provide the $x_j$ value to each rack $j \in (\Theta - \Psi)$. Upon receiving the $x_j$ value, the power storage unit 110 in rack j may then release the amount of power required to power its corresponding local server 104 in rack j plus an additional $x_j$ to the DC power supply unit 108 in rack j. The DC power supply unit 108 in rack j then provides the sufficient power to the local server 104 in rack j, and also provides the additional $x_j$ to the DC bus 114 that connects all DC power supply units 108 in the computing system 110. The DC power supply units for the servers in $\Psi$, i.e., the servers that determined to have insufficient local power supply, may then draw the power from the DC bus 114 to continue their operations.

Figure 2:
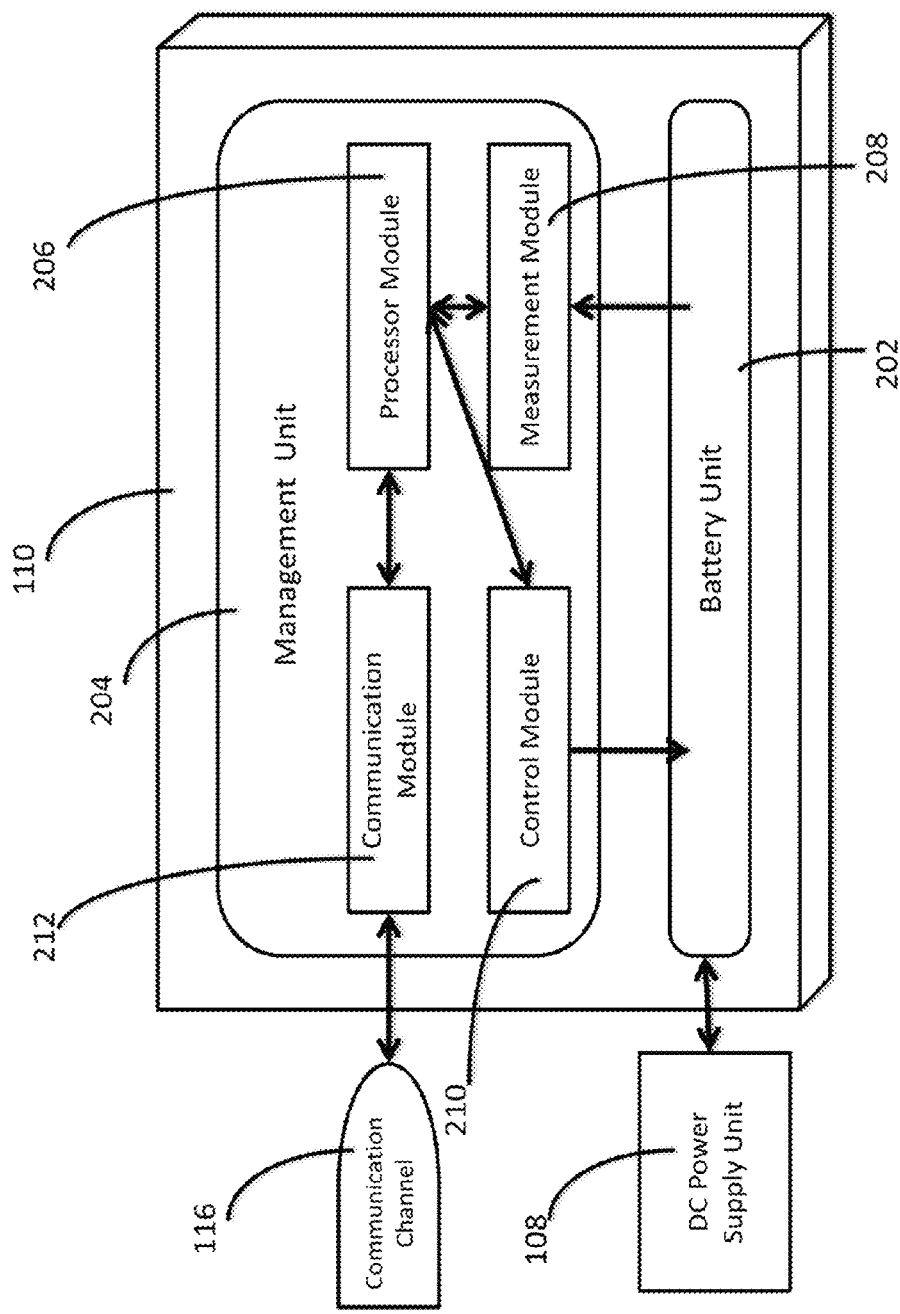
FIG. 2 is a block diagram depicting an exemplary power storage unit in accordance with one embodiment of the present disclosure.

FIG. 2 depicts an exemplary power storage unit 110 in accordance with one embodiment of the present disclosure. The power storage unit 110 includes a battery unit 202 and a management unit 204. The management unit 204 further includes a processor module 206, a measurement module 208, a control module 210 and a communication module 212. The processor module 206 is configured for executing instructions and providing coordination between the measurement module 208, the control module 210 and the communication module 212. The measurement module 208 is configured for measuring and monitoring information such as SOC, load or the like of the battery unit 202 in real-time. The control module 210 is configured for controlling and adjusting the output of the battery unit 202. The communication module 212 is configured for providing communication between the power storage unit 110 and the power supply controller 112 via a communication channel 116. It is contemplated that the communication channel 116 may be implemented using wired or wireless communication means without departing from the spirit and scope of the present disclosure.

The power storage unit 110 is electrically coupled with its corresponding DC power supply unit 108. When the DC power supply unit 108 is receiving power from mains (i.e., under normal operating conditions), the power storage unit 110 receives power from its corresponding DC power supply unit 108. On the other hand, when the power from mains is interrupted, the power storage unit 110 provides power to its corresponding DC power supply unit 108, as described above.

Figure 3:
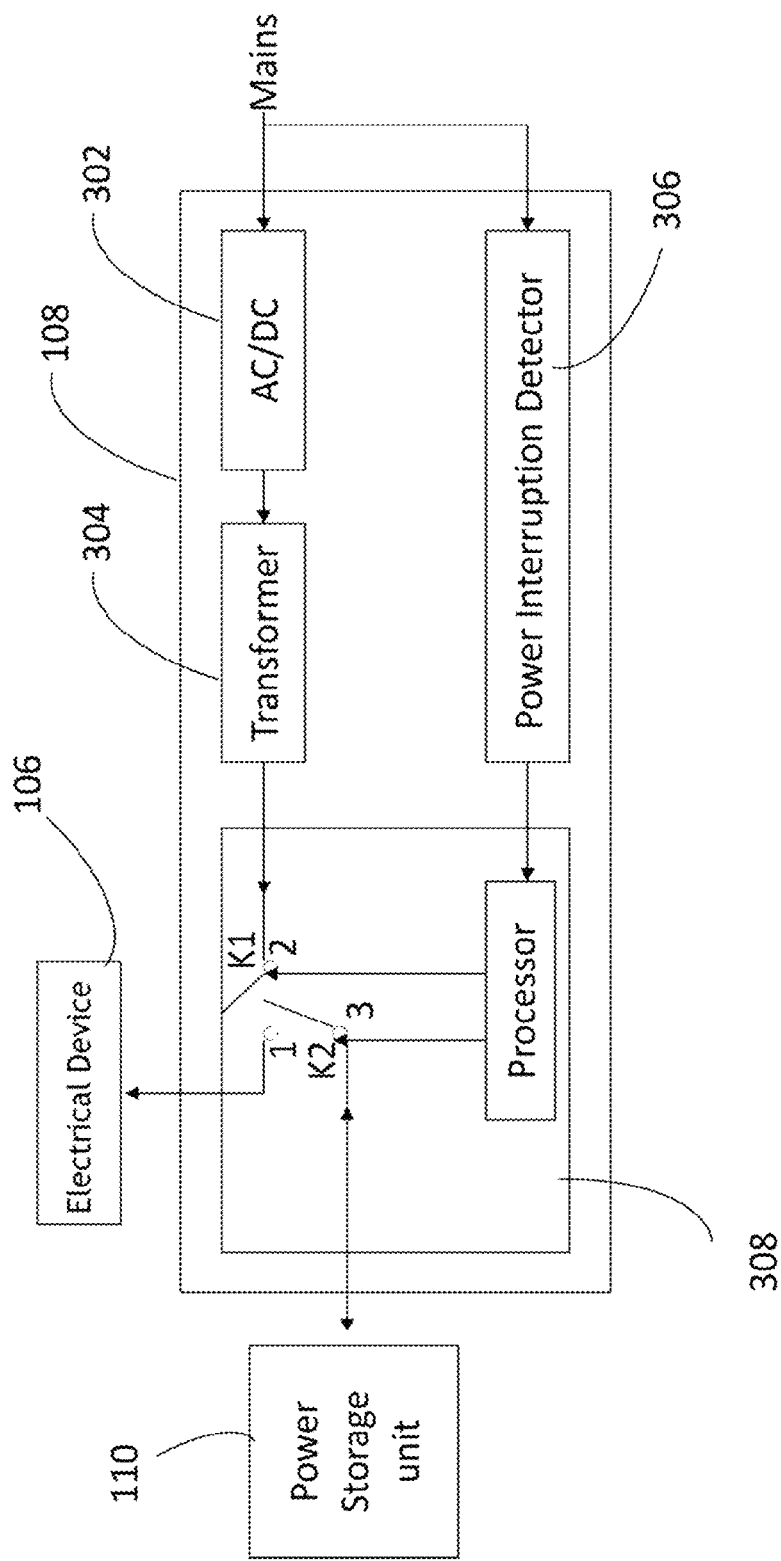
FIG. 3 is a block diagram depicting an exemplary power supply unit in accordance with one embodiment of the present disclosure.

FIG. 3 depicts an exemplary DC power supply unit 108 in accordance with one embodiment of the present disclosure.

The DC power supply unit 108 includes an AC/DC convertor 302, a transformer 304, a power interruption detector 306 and a switch board 308. The AC/DC convertor 302 converts the power received from mains to DC power. The transformer 304 transforms the converted DC power to the desired voltage and provides the power to the switch board 308. The power interruption detector 306 detects whether an interruption has occurred and communicates with a controller 310 of the switch board 308 to take appropriate actions.

The switch board controller 310 controls two switches, K1 and K2, as indicated in the figure. In the exemplary embodiment depicted in FIG. 3, switch K1 has two possible states: engaged, which powers the server 106 using converted DC power from mains; or disengaged, which cuts off mains power to the server 106. Switch K2, on the other hand, has three possible states: engaged at P1, engaged at P2, or disengaged. This configuration provides the following power arrangements: 1) when K1 is engaged and K2 is disengaged, the DC power supply unit 108 powers the server 106 using mains power; 2) when K1 is engaged and K2 is engaged at P2, the DC power supply unit 108 powers the server 106 and charges the power storage unit 110 using mains power; and 3) when K1 is disengaged and K2 is engaged at P1, the DC power supply unit 108 powers the server 106 using the power storage unit 110.

Figure 4:
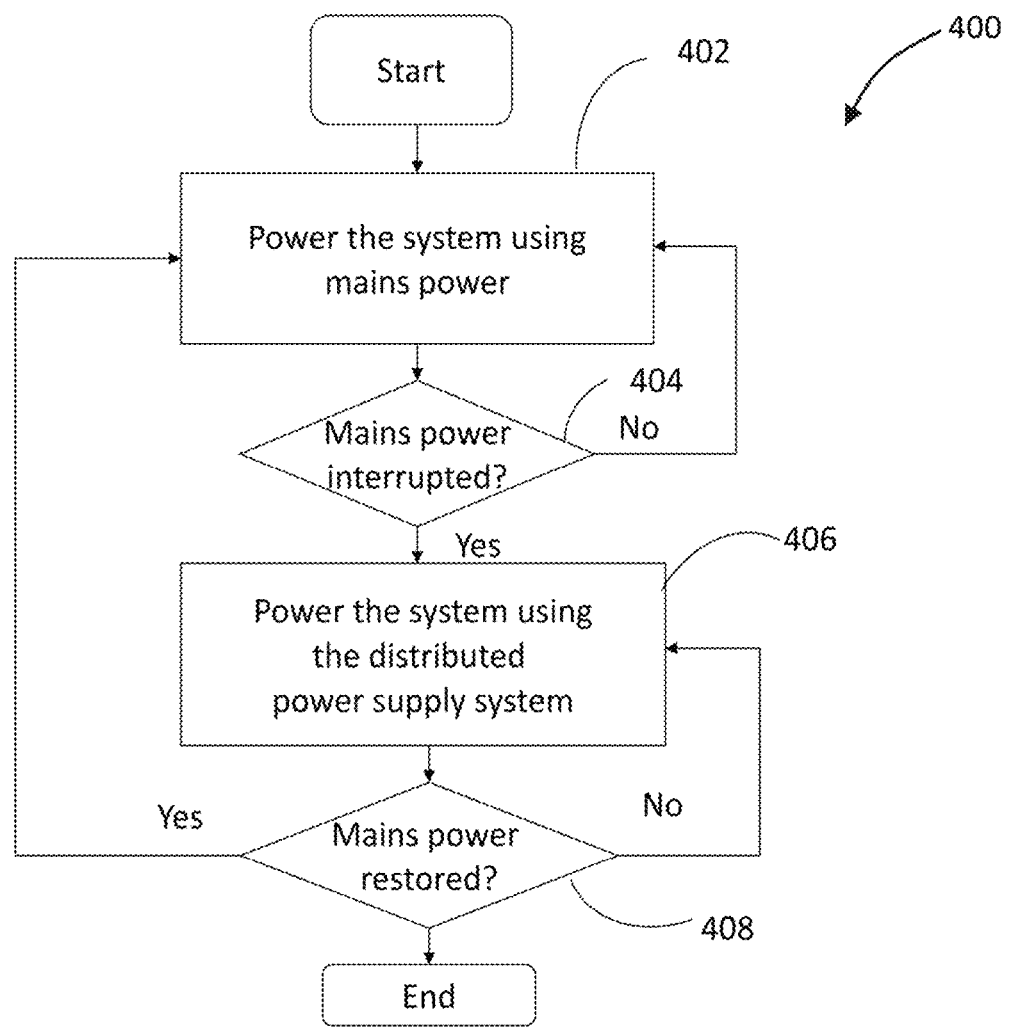
FIG. 4 is a flow diagram illustrating a method for providing distributed power supply.

Referring now to FIG. 4, a flow diagram illustrating a method 400 for providing distributed power supply in accordance with the present disclosure is shown. Under normal operating conditions, step 402 provides mains power to a plurality of power supply units located on different server racks to power their corresponding servers. The power supply unit located on each server rack may also communicate with its corresponding power storage unit to determine whether to charge the power storage unit. For instance, if the measurement module of the power storage unit indicates that the power storage unit is not fully charged, the power supply unit may engage switch K2 at P2 to charge the power storage unit. Once the measurement module of the power storage unit indicates that the power storage unit is fully charged, switch K2 may be disengaged.

Step 404 continuously monitors the mains power and determines whether an interruption has occurred. In the event of an interruption, step 406 switches the power supply for each server from mains power to its corresponding local power storage unit. Step 406 further identifies whether there are any server racks with insufficient local power supply, and utilizes an optimization function to coordinate among the various power storage units to provide sufficient shared power supply as previously described. Such a configuration provides power sharing abilities that allow any given power storage unit to provide power to any server during the interruption. Once it is determined that the mains power is restored in step 408, the method may return to normal operating conditions.

Figure 5:
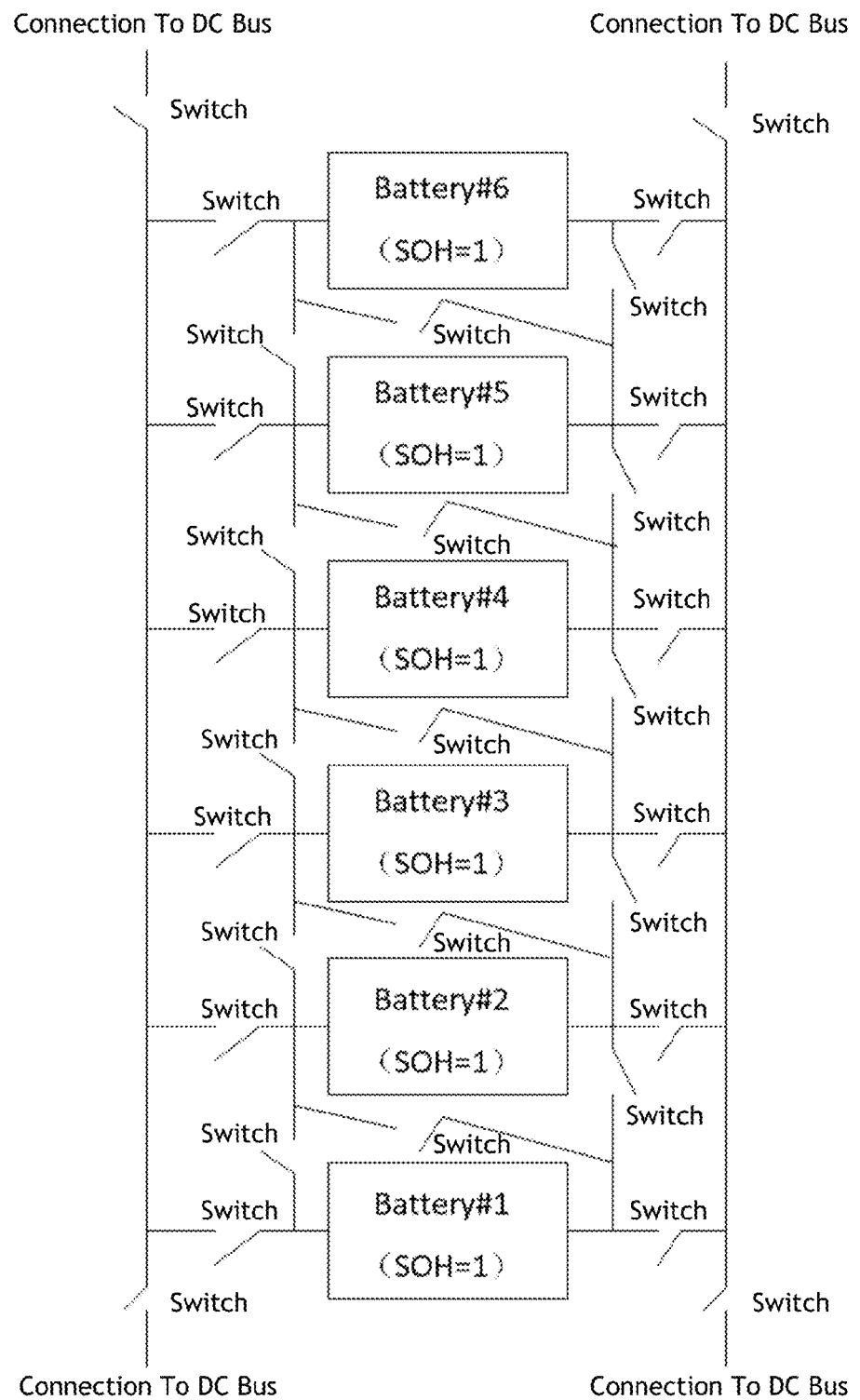
FIG. 5 is a block diagram depicting an adjustable battery unit.

It is contemplated that the battery unit included in each power storage unit may include one or more individual batteries arranged in serial, parallel, or combination of serial and parallel. The individual batteries may also be arranged in a dynamically adjustable manner as shown in FIG. 5. The various switches depicted in FIG. 5 allow the connection among the individual batteries to be adjustable to meet the output requirement. It is also contemplated that each individual battery may include one or more battery cells arranged in a serial, a parallel, or an adjustable manner without departing from the spirit and scope of the present disclosure.

It is also contemplated that various techniques may be utilized to estimate battery capacities. For instance, the process disclosed in U.S. patent application Ser. No. 13/033,519 filed on Feb. 23, 2011 and entitled "Circuit Based Method for Estimating Battery Capacity", which is incorporated herein by reference, may be utilized to estimate battery capacities without departing from the spirit and scope of the present disclosure.

Furthermore, it is understood that the battery unit included in different power storage units are not required to be uniform. While a uniform configuration may provide interchangeable parts and lowers system maintenance cost, the method and system in accordance with the present disclosure allows the battery units to vary. Different battery units may be utilized for different server racks based on considerations such as power consumptions, space availabilities, cost concerns, as well as other factors.

It is also understood that the method and system in accordance with the present disclosure is not limited to providing power supplies to rack-mounted servers. For instance, consider each rack in FIG. 1 generally as a subsystem location and consider each server in FIG. 1 generally as an electrical device, the method and system in accordance with the present disclosure may therefore be utilized to provide distributed power supply to any system having one or more electrical devices located at multiple locations.

The ability to provide distributed power supply to systems as described in the present disclosure may be appreciated in various environments. While there are distributed UPS devices currently available, such devices do not utilize the distributed battery management that takes into consideration the SOC level and the power load level as described in the present disclosure.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A distributed power supply system, comprising:
a plurality of power storage units;

a plurality of DC power supply units, each particular DC power supply unit of the plurality of DC power supply units corresponding to one particular power storage unit of the plurality of power storage units, each particular DC power supply unit being operable in at least one of:
  a first mode when the particular DC power supply unit receives mains power, the particular DC power supply unit converts mains power to DC power and provides DC power to at least one electrical device coupled to the particular DC power supply unit; and
  a second mode when the particular DC power supply unit does not receive mains power, the particular DC power supply unit draws DC power from its corresponding power storage unit and provides DC power to the at least one electrical device coupled to the particular DC power supply unit; and
a power supply controller in communication with each of the plurality of power storage units, the power supply controller configured for controlling output power of each of the plurality of power storage units by optimizing output power of each of the plurality of power storage units based on status of charge (SOC) C and load L of each of the plurality of power storage units,
wherein optimizing output power of each of the plurality of power storage units based on SOC and load of each of the plurality of power storage units further comprises:
  for each power storage unit i of the plurality of power storage units, determining whether power storage unit i have sufficient SOC based on $C_i - L_i \geq C_{threshold}$ and calculating a supplemental power $\Delta L_i = L_i - C_i + C_{threshold}$ when power storage unit i have insufficient SOC;
  determining an optimal solution for an optimization function defined as:

$$\text{Minimize: } \sum_{j \in (\Theta - \Psi)} \frac{x_j}{C_i - L_i - C_{threshold}}$$

$$\text{Subject to: } \sum_{j \in (\Theta - \Psi)} x = \sum_{i \in \Psi} \Delta L_i$$

$$x_j \geq 0, \forall j \in (\Theta - \Psi)$$

wherein $\Theta$ denotes the set of all power storage units, $\Psi$ denotes the set of power storage units that have insufficient SOC, and x denotes supplemental output power needed from power storage unit j; and
  adjusting output power of power storage unit j, $j \in (\Theta - \Psi)$ based on the calculated supplemental power $x_j$.

2. The distributed power supply system of claim 1, wherein optimizing output power of each of the plurality of power storage units based on SOC and load of each of the plurality of power storage units further comprises:
  identifying the power storage units that have insufficient SOC; and
  adjusting output power of the power storage units that have sufficient SOC to provide supplemental power to the power storage units that have insufficient SOC.

3. The distributed power supply system of claim 1, wherein each particular power storage unit of the plurality of power storage units is configured to self-monitor the SOC and the load of that particular power storage unit.

4. The distributed power supply system of claim 1, wherein each particular DC power supply unit is operable in a third mode, wherein when the particular DC power supply unit receives mains power, the particular DC power supply unit converts mains power to DC power, provides DC power to at least one electrical device coupled to the particular DC power supply unit, and provides DC power to charge its corresponding power storage unit with proper charging current and voltage based on SOC.

5. A method for managing a distributed power supply system, the distributed power supply system including a plurality of power storage units, the method comprising:
  for each power storage unit i of the plurality of power storage units, determining whether power storage unit i have sufficient status of charge (SOC) based on whether SOC of the power storage unit i ($C_i$) minus load of the power storage unit i ($L_i$) is less than a predetermined SOC threshold;
  identifying a set of power storage units that have insufficient SOC;
  calculating a supplemental power needed for each power storage unit i in the set of power storage units that have insufficient SOC;
  determining an optimal solution for providing the supplemental power needed for each power storage unit i in the set of power storage units that have insufficient SOC, wherein the optimal solution is determined as a solution for an optimization function; and
  adjusting output power of the power storage units that have sufficient SOC to provide supplemental power to the set of power storage units that have insufficient SOC based on the determined optimal solution,
wherein the optimization function is defined as:

$$\text{Minimize: } \sum_{j \in (\Theta - \Psi)} \frac{x_j}{C_i - L_i - C_{threshold}}$$

$$\text{Subject to: } \sum_{j \in (\Theta - \Psi)} x = \sum_{i \in \Psi} \Delta L_i$$

$$x_j \geq 0, \forall j \in (\Theta - \Psi)$$

wherein $\Theta$ denotes the set of all power storage units, $\Psi$ denotes the set of power storage units that have insufficient SOC, and x denotes supplemental output power needed from power storage unit j.

6. The method of claim 5, wherein whether power storage unit i have sufficient SOC is determined based on whether $C_i - L_i \geq C_{threshold}$.

7. The method of claim 5, wherein each particular power storage unit of the plurality of power storage units self-monitors the SOC and load of that particular power storage unit.

8. The method of claim 5, wherein the supplemental power needed for each power storage unit i in the set of power storage units that have insufficient SOC is calculated as $\Delta L_i = L_i - C_i + C_{threshold}$.

9. A method for managing a distributed power supply system, the distributed power supply system including a plurality of power storage units, the method comprising:

for each power storage unit i of the plurality of power storage units, determining whether power storage unit i have sufficient status of charge (SOC) based on SOC of the power storage unit i ($C_i$), and load of the power storage unit i ($L_i$);

identifying a set of power storage units that have insufficient SOC;

calculating a supplemental power $\Delta L_i = L_i - C_i + C_{threshold}$ when power storage unit i have insufficient SOC;

determining an optimal solution for an optimization function defined as:

Minimize:
$$\sum_{j \in (\Theta - \Psi)} \frac{x_j}{C_i - L_i - C_{threshold}}$$

Subject to:

$$\sum_{j \in (\Theta - \Psi)} x = \sum_{i \in \Psi} \Delta L_i$$

$$x_j \geq 0, \forall j \in (\Theta - \Psi)$$

wherein $\Theta$ denotes the set of all power storage units, $\Psi$ denotes the set of power storage units that have insufficient SOC, and x denotes supplemental output power needed from power storage unit j; and adjusting output power of power storage unit j, $j \in (\Theta - \Psi)$ based on the calculated supplemental power $x_j$ to provide supplemental power to the set of power storage units that have insufficient SOC.

10. The method of claim 9, wherein whether power storage unit i have sufficient SOC is determined based on whether $C_i - L_i \geq C_{threshold}$.

* * * * *